(12) United States Patent
Klotzbuecher et al.

(10) Patent No.: US 11,300,660 B2
(45) Date of Patent: Apr. 12, 2022

(54) DETERMINING RELATIVE VELOCITY IN A VEHICLE RADAR SYSTEM

(71) Applicants: Dirk Klotzbuecher, Mainstockheim (DE); Christian Schwert, Haßfurt (DE); Philipp Stark, Eßleben (DE)

(72) Inventors: Dirk Klotzbuecher, Mainstockheim (DE); Christian Schwert, Haßfurt (DE); Philipp Stark, Eßleben (DE)

(73) Assignee: VEONEER SWEDEN AB, Vargarda (SE)

( * ) Notice: Subject to any disclaimer, the term of this patent is extended or adjusted under 35 U.S.C. 154(b) by 378 days.

(21) Appl. No.: 16/331,016

(22) PCT Filed: Sep. 8, 2017

(86) PCT No.: PCT/EP2017/072606
§ 371 (c)(1),
(2) Date: Mar. 6, 2019

(87) PCT Pub. No.: WO2018/046673
PCT Pub. Date: Mar. 15, 2018

(65) Prior Publication Data
US 2019/0204415 A1 Jul. 4, 2019

(30) Foreign Application Priority Data
Sep. 9, 2016 (EP) .................................. 16187957

(51) Int. Cl.
*G01S 7/41* (2006.01)
*G01S 13/536* (2006.01)
(Continued)

(52) U.S. Cl.
CPC ............ *G01S 7/415* (2013.01); *G01S 13/536* (2013.01); *G01S 13/726* (2013.01);
(Continued)

(58) Field of Classification Search
CPC ...... G01S 7/415; G01S 13/536; G01S 13/726; G01S 13/931; G01S 2013/9315; G01S 2013/93274; G01S 13/42
See application file for complete search history.

(56) References Cited

U.S. PATENT DOCUMENTS 5,929,803 A * 7/1999 Uehara .................. G01S 7/415
342/70
7,598,904 B2 10/2009 Klotzbuecher et al.
(Continued)

FOREIGN PATENT DOCUMENTS

DE 10 2013 200 951 A1 7/2014
WO WO 2014/150908 A1 9/2014

OTHER PUBLICATIONS

International Search Report and Written Opinion of PCT/EP2017/072606 dated Dec. 8, 2017.

*Primary Examiner* — Donald H B Braswell
(74) *Attorney, Agent, or Firm* — Dickinson Wright PLLC

(57) ABSTRACT

A vehicle radar system (3) mounted in a host vehicle (1) arranged to run in a forward running direction (D). The vehicle radar system (3) includes a transceiver arrangement (7) to generate and transmit radar signals (4), and to receive reflected radar signals (5), the transmitted radar signals (4) have been reflected by one or more objects (6, 12). The radar system (3) provides range ($r_n$), azimuth angle ($\theta_n$) and radial velocity ($v_m$) for a plurality of measurement points (9, 9') at the objects (6, 12). The radar system (3) is divides a total detection volume (8) into at least two partial volumes (8a, 8b, 8c, 8d), and performs a velocity estimation for each partial volume (8a, 8b, 8c, 8d) such that a total velocity distribution (14) is acquired along a side extension (E) that is perpendicular to an extension along the vehicle forward running direction (D).

10 Claims, 3 Drawing Sheets

(51) Int. Cl.
  *G01S 13/931* (2020.01)
  *G01S 13/72* (2006.01)
  *G01S 13/42* (2006.01)

(52) U.S. Cl.
  CPC ............ *G01S 13/931* (2013.01); *G01S 13/42* (2013.01); *G01S 2013/9315* (2020.01); *G01S 2013/93274* (2020.01)

(56) References Cited

U.S. PATENT DOCUMENTS

| | | |
|---|---|---|
| 9,255,988 B2 | 2/2016 | Zeng et al. |
| 9,933,518 B2 | 4/2018 | Schoor |
| 10,042,050 B2 | 8/2018 | De Mersseman et al. |
| 2008/0266170 A1* | 10/2008 | Klotzbuecher ......... G01S 13/58 342/113 |
| 2015/0198711 A1* | 7/2015 | Zeng .................... G01S 13/726 342/59 |
| 2016/0033640 A1* | 2/2016 | De Mersseman ..... G01S 7/2813 342/70 |
| 2016/0203374 A1* | 7/2016 | Zeng ........................ G06T 7/75 382/104 |

* cited by examiner

DETERMINING RELATIVE VELOCITY IN A VEHICLE RADAR SYSTEM

CROSS-REFERENCE TO RELATED APPLICATIONS

This application is a 35 U.S.C. § 371 national phase of PCT International Application No. PCT/EP2017/072606, filed Sep. 8, 2017, which claims the benefit of priority under 35 U.S.C. § 119 to European Patent Application No. 16187957.2, filed Sep. 9, 2016, the contents of which are incorporated herein by reference in their entirety.

FIELD OF THE INVENTION

The present disclosure relates to a vehicle radar system arranged to generate, transmit and receive reflected radar signals. The radar system is arranged to provide range, azimuth angle and radial velocity for a plurality of measurement points.

BACKGROUND

Many vehicle radar systems include radar transceivers that are arranged for generating radar signals that are transmitted, reflected and received by use of appropriate antennas of the radar system. The radar signals may for example be in the form of FMCW (Frequency Modulated Continuous Wave) signals.

A problem which frequently occurs in the steering of vehicles is the difficulty in noticing objects in proximity to the vehicle which are located in a position not easily seen by the driver. A position such as this is conventionally known as the blind spot which for example typically is located in a direction of 90° to 170° from the direction of travel, both to the left and to the right of the motor vehicle. It is important for the driver of a vehicle to be alerted to the presence of objects in the blind spot, particularly when turning or changing lanes in a multi-lane road or highway.

For this purpose, vehicles have been equipped with radar systems that are arranged to detect the presence of an object in the blind spot and automatically produce a signal which alerts the driver of the vehicle to the presence of the obstacle. In order to achieve this, a radar system must be able to determine the relative velocity between the vehicle into which it is fitted and a potential obstacle in order to distinguish the obstacle from stationary objects.

The document U.S. Pat. No. 7,598,904 describes how a relative velocity between two objects; a host vehicle including a radar system and a target vehicle, is determined. The radial velocity and the azimuth angle between the direction of observation and the direction of movement of the host vehicle are determined for a large number of measurement points, forming a cluster or cloud of measurement points. The relative velocity is determined as an average of velocity components in a direction of driving.

However, in situations with small vehicles in front of a stationary object, such as for example a bicycle in front of a wall, the cluster of measurement points which is used is a mixture of detections from the small vehicle and from the background. In this situation, the calculated relative velocity does not match the real relative velocity of the small vehicle resulting in that it is not detected as a moving object.

It is therefore desired to provide a vehicle radar system that is able to provide a more stable and reliable relative velocity difference between a host vehicle, including a radar system, and a target vehicle or other object.

The object of embodiments of the present disclosure is thus to provide a vehicle radar system that is able to provide a more stable and reliable relative velocity difference between a host vehicle, including a radar system, and a target vehicle or other object.

SUMMARY AND INTRODUCTORY DESCRIPTION

The above-described object is achieved by use of a vehicle radar system arranged to be mounted in a host vehicle arranged to run in a forward running direction. The vehicle radar system includes at least one transceiver arrangement arranged to generate and transmit radar signals, and to receive reflected radar signals, where the transmitted radar signals have been reflected by one or more objects. The radar system is arranged to provide range, azimuth angle and radial velocity for a plurality of measurement points at the objects. The radar system is furthermore arranged to divide a total detection volume into at least two partial volumes, and to perform a velocity estimation for each partial volume, such that a total velocity distribution is acquired along a side extension that is perpendicular to an extension along the forward running direction.

This object is also achieved by use of a method for a vehicle radar system, where the method includes the steps of:

Generating and transmitting radar signals.

Receiving reflected radar signals, where the transmitted radar signals have been reflected by one or more objects.

Providing azimuth angle and radial velocity for a plurality of measurement points at the objects.

Dividing a total detection volume into at least two partial volumes.

Performing a velocity estimation for each partial volume such that a total velocity distribution is acquired along a side extension that is perpendicular to an extension along a forward running direction.

According to an example embodiment of the invention, the radar system is arranged to check whether the magnitude of the total velocity distribution changes from one partial volume to another partial volume such that the change exceeds a certain threshold, and if that is the case, to group measurement points corresponding to a certain partial velocity distribution.

According to another example embodiment of the invention, the radar system is arranged to form the partial volumes as mutually parallel slices.

According to another example, the radar system is arranged to only take an x-component of the radial velocity into account when the radial velocity is determined.

Other example embodiments are disclosed in the this description with its accompanying drawing figures.

A number of advantages are obtained by use of embodiments of the present invention. Mainly, a vehicle radar system is provided that is able to provide a more stable and reliable relative velocity difference between a host vehicle, having a radar system, and a target vehicle or other object. In particular, smaller target vehicles are distinguished from background objects to a higher degree than before.

BRIEF DESCRIPTION OF THE DRAWINGS

The present disclosure will now be described more in detail with reference to the appended drawings, where.

DETAILED DESCRIPTION

Figure 1:
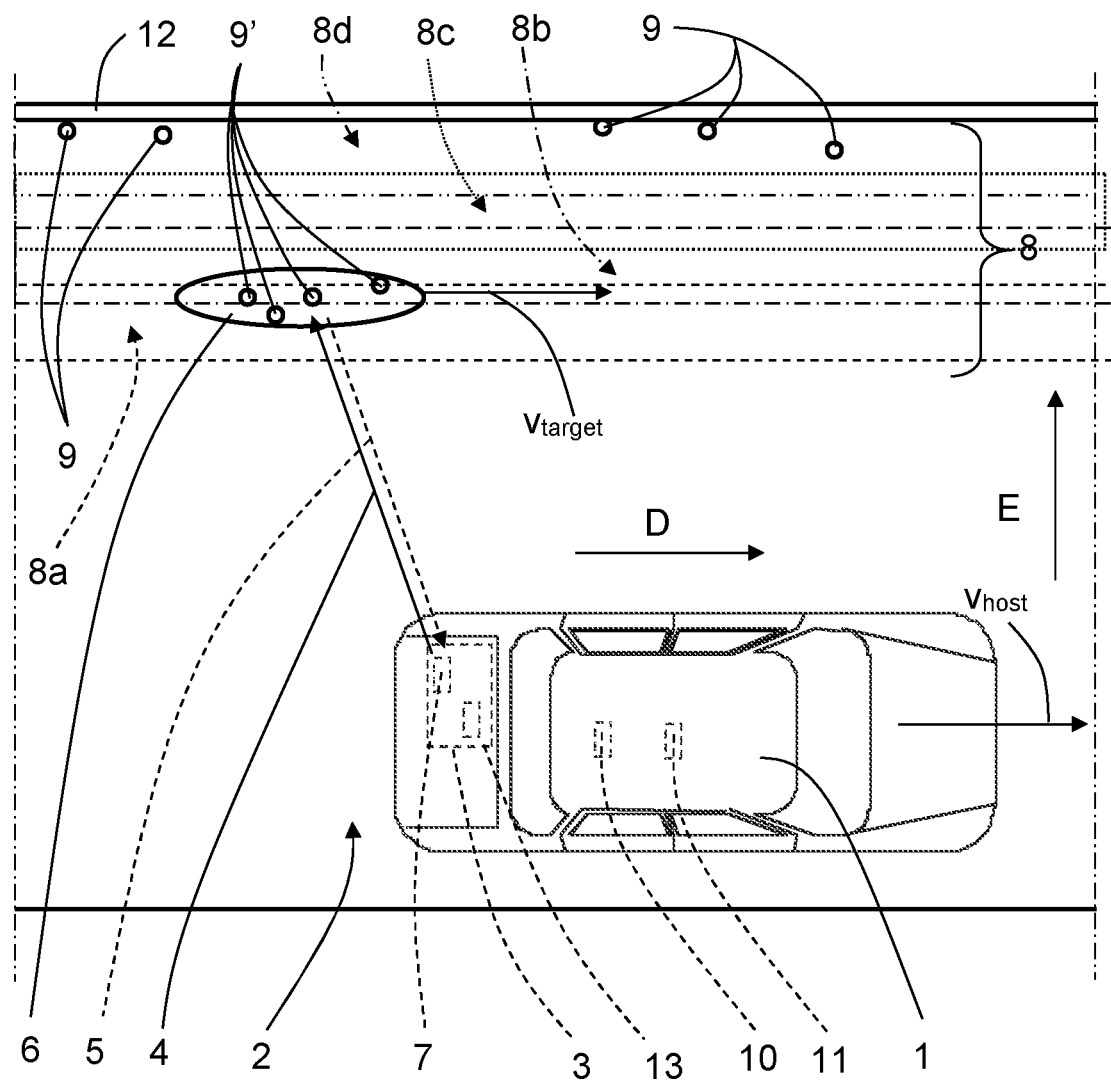
FIG. 1 shows a schematic top view of a vehicle and target object.

FIG. 1 schematically shows a top view of a vehicle 1 arranged to run on a road 2 in a forward running direction D, where the vehicle 1 includes a vehicle radar system 3 which is arranged to distinguish and/or resolve single targets from the surroundings by transmitting signals 4 and receiving reflected signals 5 and using a Doppler effect in a previously well-known manner. The vehicle radar system 3 thus includes a radar transceiver arrangement 7 and is arranged to provide range, azimuth angle and radial velocity of possible target objects 6, here in the form of a target vehicle 6, by simultaneously sampling and analyzing phase and amplitude of the received signals 5 by use of Doppler signal processing in a previously known manner by one or more control units 13. This will be discussed more in detail later with reference to FIG. 2. The distance to the target objects 6 is according to some aspect also acquired.

According to some aspects, the radar signals may be in the form of FMCW (Frequency Modulated Continuous Wave) Doppler signals operating at 77 GHz.

The host vehicle 1, is running at a host velocity \most alongside the target vehicle 6, in this example in the form of a schematically indicated bicycle, which is running at a target velocity $v_{target}$. Behind the target vehicle 6 there is a stationary object; in this example a wall 12. By use of the vehicle radar system 3, the radial velocity and the azimuth angle between the direction of observation and the direction of movement of the host vehicle 1 are acquired for a large number of measurement points 9, 9' (only a few shown for reasons of clarity) where there is a total number N of measurements points.

Figure 2:
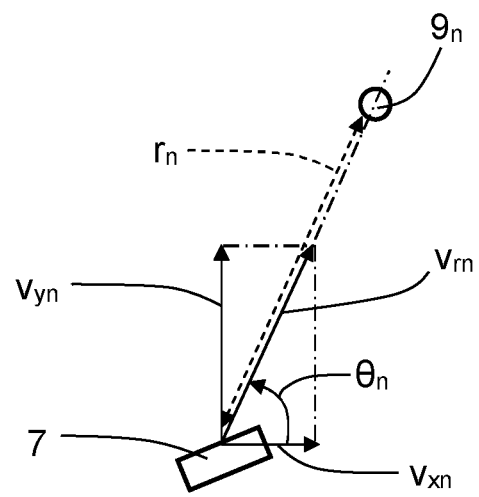
FIG. 2 shows radial velocity and azimuth angle for a certain measurement point.

With reference also to FIG. 2, a range $r_n$, a radial velocity $v_{rn}$ and an azimuth angle $\theta_n$ between the direction of observation and the direction of movement of a certain measurement point $9_n$, being an n:th measurement point, n=1 ... N.

In the following, the certain n:th measurement point $9_n$, n=1 N, among all the measurement points 9, 9' will be discussed.

The radial velocity $v_{rn}$ has an x-component $v_{xn}$ and a y-component $v_{yn}$, where the x-component $v_{xn}$ runs parallel to the direction D and the y-component $v_{yn}$ runs perpendicular to the x-component $v_{xn}$.

The radial velocity $v_{rn}$ is determined, for example, from the Doppler frequency and the Doppler phase shift. Information on the range may also be included for the measurement point $9_n$.

The desired differential velocity between the host vehicle 1 and the target vehicle 8 is:

$$\Delta V = V_{target} - V_{host} \quad (1)$$

For the measurement point $9_n$, a radial velocity, $V_{rn}$ is calculated according to:

$$V_{rn} = \Delta V \cdot \cos(\theta n) \quad (2)$$

If it is assumed that the host vehicle 1 and the target vehicle 8 run substantially parallel to one another, the radial velocity $V_{rn}$ will not have a y-component $v_{yn}$ for the measurement point $9_n$, and the relative velocity for the measurement point $9_n$ corresponds respectively to the x-component $V_{xn}$.

The x-component $V_{xn}$ of the radial velocity $V_{rn}$ for the measurement point $9_n$ is calculated according to:

$$v_{xn} = \frac{v_{rn}}{\cos(\theta_n)} \quad (3)$$

An estimation ΔV' of the actual relative velocity ΔV can now be obtained by determining the average of the quotients according to equation (3). This can be written as:

$$\Delta V' = \frac{\overline{V_{rn}}}{\cos(\theta_n)}, \quad (4)$$

where $\overline{v_{rn}}$ is the average of the radial velocity of all measurement points 9, 9' calculated according to equation (2).

According to the present disclosure, in order to facilitate the possibility to distinguish between measurement points 9 at the wall 12 and measurement points 9' at the target vehicle 6, a total detection volume 8 is divided into at least two overlapping partial volumes, here in the form of four slices; a first partial volume 8a, a second partial volume 8b, a third partial volume 8c and a fourth volume partial 8d. The target vehicle 6 is positioned in the first partial volume 8a and the second partial volume 8b.

Figure 3:
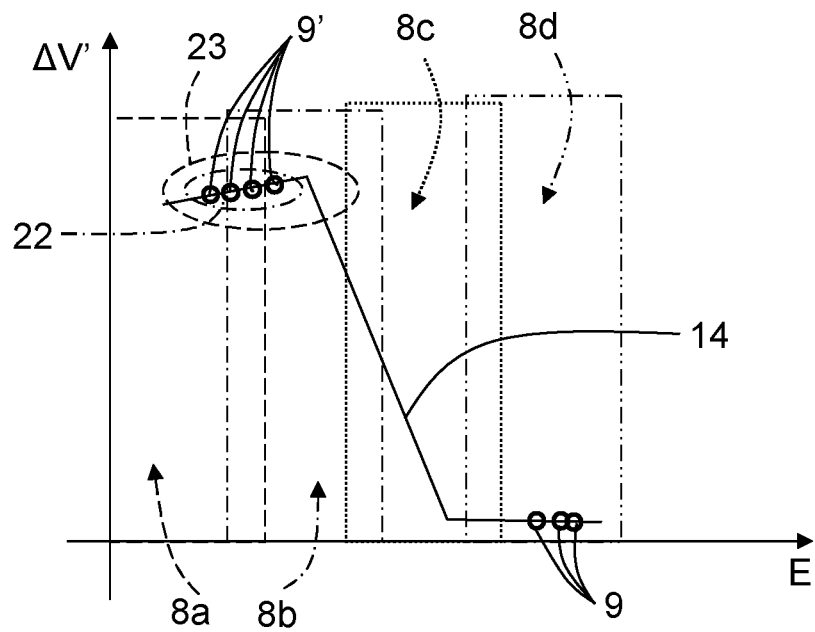
FIG. 3 shows an estimation ΔV' of the actual relative velocity as a function of the side extension E for all measurement points.

The control unit 13 is arranged to perform a velocity estimation for each partial volume 8a, 8b, 8c, 8d, 8e such that a total velocity distribution 14 is acquired along a side extension E that is perpendicular to the extension of the direction D, as illustrated in FIG. 3 that shows the estimation ΔV' of the actual relative velocity, according to Equation 4, as a function of the side extension E for all the measurement points 9, 9'.

The control unit 13 is further arranged to check whether the magnitude of the total velocity distribution 14 changes from one partial volume to another partial volume such that the change exceeds a certain threshold. If that is the case, those measurement points 9' corresponding to a certain partial velocity distribution 22 are determined to belong to a certain group 23 of measurement points 9'.

In this way, one or more groups of measurement points 9, 9' are formed, where each group of measurement points 9, 9' corresponds to one or more partial volumes and to a certain partial velocity distribution 22. Adjacent groups of measurement points 9, 9' have a difference of velocity distribution magnitude that exceeds a certain threshold. In this manner target objects with different velocities can be separated from each other.

Here, one partial velocity distribution 22 determined to belong to a certain group 23 of measurement points 9' is shown, corresponding to the target vehicle. Another partial velocity distribution can be determined to belong to a certain group of measurement points 9 corresponding to the wall 12.

It is for example conceivable that there are several moving target objects in FIG. 1, such as for example two bicycles moving with different velocities and a slower pedestrian. By use of the present disclosure, these can be separated from each other.

As schematically indicated in FIG. 1, the vehicle 1 includes a safety control unit 10 and safety system 11, for example an emergency braking system and/or an alarm signal device. The safety control unit 10 is arranged to control the safety system 11 in dependence of input from the radar system 3.

Figure 4:
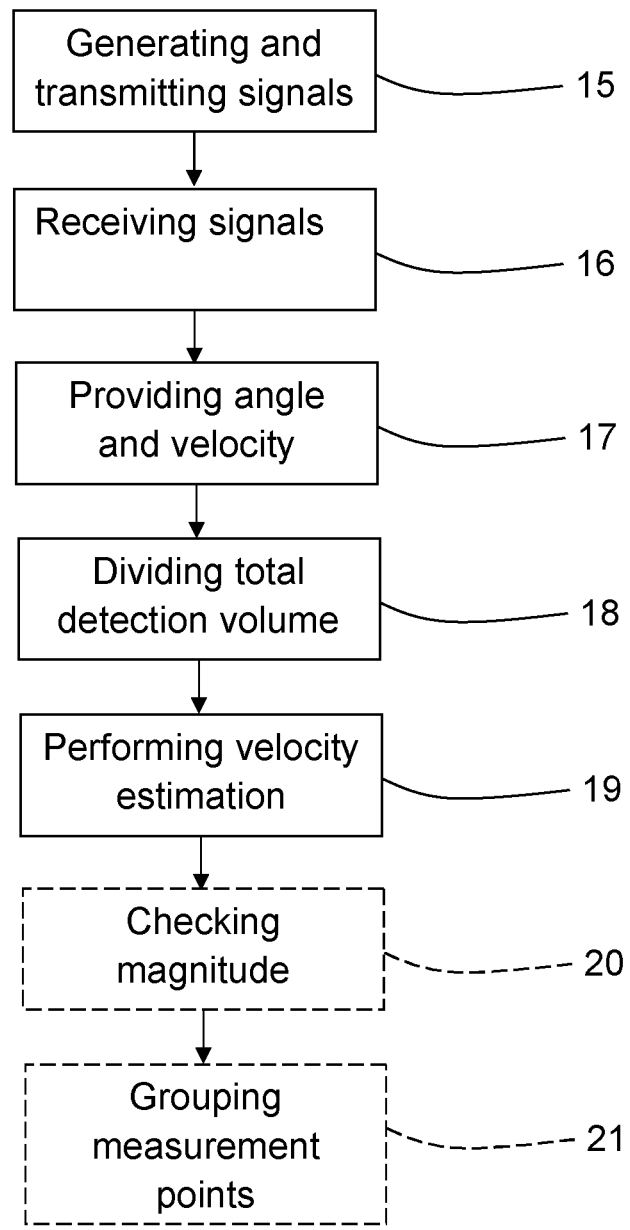
FIG. 4 shows a flowchart for methods according to the present disclosure.

With reference to FIG. 4, the present disclosure also relates to a method for a vehicle radar system, where the method includes the steps of:

Step 15: Generating and transmitting radar signals 4.

Step 16: Receiving reflected radar signals 5, where the transmitted radar signals 4 have been reflected by one or more objects 6, 12.

Step 17: Providing range $r_n$, azimuth angle $\theta_n$ and radial velocity $v_{rn}$ for each one of a plurality of measurement points 9, 9' at the objects 6, 12.

Step 18: Dividing a total detection volume 8 into at least two partial volumes 8a, 8b, 8c, 8d.

Step 19: Performing a velocity estimation for each partial volume 8a, 8b, 8c, 8d such that a total velocity distribution 14 is acquired along a side extension E that is perpendicular to an extension along a forward running direction D.

According to a further example, the method also includes the steps of:

Step 20: Checking whether the magnitude of the total velocity distribution 14 changes from one partial volume to another partial volume such that the change exceeds a certain threshold, and, if that is the case, Step 21: grouping measurement points 9' corresponding to a certain partial velocity distribution 22.

The present disclosure is not limited to the examples above, but may vary freely within the scope of the appended claims. For example, the radar system may be implemented in any type of vehicle such as cars, trucks and buses as well as boats and aircraft.

The radar transceiver 7 is adapted for any suitable type of Doppler radar in a Doppler radar system. There may be any number of radar transceivers 7 in the vehicle radar system 3, and they may be arranged for transmission and signals in any suitable direction. The plurality of sensing sectors or sensing bins may thus be directed in other desirable directions, such as rearwards or at the sides of the vehicle 1.

Radar signal processing is performed by one or more control units 13 used in any kind of suitable processor arrangement used in the vehicle radar system 3, such as a DSP (Digital Signal Processor) or an RCU (Radar Control Unit) which according to some aspects includes a DSP.

The direction of the relative velocity ΔV that is desired has been shown to coincide with the running direction of the vehicles 1, 8. However, the direction of the relative velocity ΔV that is desired may have any suitable direction. According to an aspect, the target vehicle is constituted by any suitable object 6.

Applications like LDW (Lane Departure Warning) or LCA (Lane Change Assist) that are following objects that are on the next lane can benefit from the present disclosure to estimate the correct object velocity for adjacent objects.

The number N of measurements points can vary, but should be more than three.

In this example, the partial volumes 8a, 8b, 8c, 8d are overlapping, but this is not necessary.

Generally, the present disclosure relates to a vehicle radar system 3 arranged to be mounted in a host vehicle 1 arranged to run in a forward running direction D, the vehicle radar system 3 including at least one transceiver arrangement 7 arranged to generate and transmit radar signals 4, and to receive reflected radar signals 5, where the transmitted radar signals 4 have been reflected by one or more objects 6, 12, where the radar system 3 is arranged to provide range $r_n$, azimuth angle $\theta_n$ and radial velocity $v_{rn}$ for a plurality of measurement points 9, 9' at the objects 6, 12. The radar system 3 is arranged to divide a total detection volume 8 into at least two partial volumes 8a, 8b, 8c, 8d, and to perform a velocity estimation for each partial volume 8a, 8b, 8c, 8d such that a total velocity distribution 14 is acquired along a side extension E that is perpendicular to an extension along the forward running direction D.

According to an example embodiment, the radar system 3 is arranged to check whether the magnitude of the total velocity distribution 14 changes from one partial volume to another partial volume such that the change exceeds a certain threshold, and if that is the case, to group measurement points 9' corresponding to a certain partial velocity distribution 22.

According to an example embodiment, the radar system 3 is arranged to form the partial volumes 8a, 8b, 8c, 8d as mutually parallel slices.

According to an example, the radar system 3 is arranged to only take an x-component $V_{xn}$ of the radial velocity $V_{rn}$ into account when the radial velocity $V_{rn}$ is determined.

According to an example embodiment, the partial volumes 8a, 8b, 8c, 8d are overlapping.

According to an example embodiment, the method includes forming the partial volumes 8a, 8b, 8c, 8d as mutually parallel slices.

According to an example embodiment, the method includes only taking an x-component $V_{xn}$ of the radial velocity $V_{rn}$ into account when the radial velocity $V_{rn}$ is determined.

According to an example embodiment, the partial volumes 8a, 8b, 8c, 8d are overlapping.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system arranged to be mounted in a host vehicle arranged to run in a forward running direction, the vehicle radar system comprising, at least one transceiver arrangement arranged to generate and transmitted radar signals, and to receive reflected radar signals, where the transmitted radar signals have been reflected by one or more objects, where the radar system is arranged to provide a range, an azimuth angle and a radial velocity for a plurality of measurement points at the objects, the radar system is arranged to divide a total detection volume into at least two partial volumes, and to perform a velocity estimation for each of the partial volumes such that a total velocity distribution is acquired along a side extension that is perpendicular to an extension along the forward running direction of the vehicle; and where the velocity estimation (ΔV') for each of the partial volumes is calculated according to $$\Delta V' = \frac{\overline{v_m}}{\cos(\theta_n)}, \text{ where } \overline{v_m}$$

is the average of the radial velocities of the measurement points, $\theta_n$ is the azimuth angle of the measurement points, and where it is assumed that the host vehicle and the objects run substantially parallel to one another.

2. The vehicle radar system according to claim 1 further comprising, the radar system is arranged to check whether a magnitude of the total velocity distribution change from one of the partial volumes to another of the partial volumes such that in the event that the change exceeds a certain threshold, to group the measurement points corresponding to a certain partial velocity distribution.

3. The vehicle radar system according to claim 1 further comprising, the radar system is arranged to form the partial volumes as mutually parallel slices.

4. The vehicle radar system according to claim 1 further comprising, the radar system is arranged to only take an x-component of the radial velocity into account when the radial velocity is determined.

5. The vehicle radar system according to claim 1 further comprising, the partial volumes are at least partially overlapping.

6. A method for a vehicle radar system, where the method comprises the steps of:
   generating and transmitted radar signals;
   receiving reflected radar signals, where the transmitted radar signals have been reflected by one or more objects; and
   providing a range, an azimuth angle and a radial velocity for a plurality of measurement points at the objects
   dividing a total detection volume into at least two partial volumes; and
   performing a velocity estimation for each of the partial volumes such that a total velocity distribution is acquired along a side extension that is perpendicular to an extension along a forward running direction of the vehicle; and where the velocity estimation ($\Delta V'$) for each of the partial volumes is calculated according to $$\Delta V' = \frac{\overline{V_{rn}}}{\cos(\theta_n)},$$

where $\overline{V_{rn}}$ is the average of the radial velocities of the measurement points, $\theta_n$ is the azimuth angle of the measurement points, and where it is assumed that the host vehicle and the objects run substantially parallel to one another.

7. The method according to claim 6, characterized in that the method further comprises,
   checking whether a magnitude of the total velocity distribution changes from one of the partial volumes to another of the partial volumes such that the change exceeds a certain threshold, and, if that is the case,
   grouping the measurement points corresponding to a certain partial velocity distribution.

8. The method according to claim 6 further comprising, forming the partial volumes as mutually parallel slices.

9. The method according to claim 6 further comprising, only taking an x-component of the radial velocity into account when the radial velocity is determined.

10. The method according to claim 6 further comprising, the partial volumes are at least partially overlapping.

* * * * *